W. T. HANNA.
AUTOMATIC STOKER.
APPLICATION FILED MAY 16, 1907. RENEWED JAN. 26, 1911.

1,002,513.

Patented Sept. 5, 1911.
6 SHEETS—SHEET 2.

Witnesses
C. M. Fahnestock
Agnes B. Grant

Inventor
William T. Hanna,
By George B. Parkinson,
Attorney

W. T. HANNA.
AUTOMATIC STOKER.
APPLICATION FILED MAY 16, 1907. RENEWED JAN. 26, 1911.

1,002,513.

Patented Sept. 5, 1911.

W. T. HANNA.
AUTOMATIC STOKER.
APPLICATION FILED MAY 16, 1907. RENEWED JAN. 26, 1911.

1,002,513.

Patented Sept. 5, 1911.

Witnesses
C. M. Fahnestock
Agnes B. Grant

Inventor
William T. Hanna,
By George B. Partuum,
Attorney.

UNITED STATES PATENT OFFICE.

WILLIAM THOMPSON HANNA, OF CINCINNATI, OHIO, ASSIGNOR, BY MESNE ASSIGNMENTS, TO THE MECHANICAL CONSTRUCTION COMPANY, OF CINCINNATI, OHIO, A CORPORATION OF OHIO.

AUTOMATIC STOKER.

1,002,513.  Specification of Letters Patent.  Patented Sept. 5, 1911.

Application filed May 16, 1907, Serial No. 373,908. Renewed January 26, 1911. Serial No. 604,890.

*To all whom it may concern:*

Be it known that I, WILLIAM T. HANNA, a citizen of the United States, residing at Cincinnati, in the county of Hamilton and State of Ohio, have invented certain new and useful Improvements in Automatic Stokers, of which the following is a specification.

My invention includes novel apparatus for conveying the fuel to the fire box; for crushing the fuel; for feeding and distributing the fuel; for mechanically governing the distribution of the coal;- and for automatically governing the conveyer engine; and the invention consists in the parts and combination and arrangement of parts hereinafter described and claimed.

A represents a feed hopper inclined upwardly from the feed to the discharge end.

B represents a screw conveyer rotatably mounted in the hopper and arranged to discharge into an approximately cylindrical elbow-shaped throat, C, preferably slightly funnel-shaped with the smaller diameter at the lower end. Partially encircling the upper end of the conveyer, and fixed to the discharge end of the hopper, is a crushing knife $a$ adapted to engage with and break any lumps of coal which by reason of their size might otherwise interfere with the feed. The knife is in the form of a segment of a funnel with the edge representing the larger and the heel the smaller arc. The throat leads into a fuel conduit, composed of two approximately semi-cylindrical elbowed sections, D D', hinged at $e, e$, to the fuel door casing, E, of a locomotive engine furnace, in such manner that they may swing clear of the fuel opening, thereby allowing ready access to the fire box for raking or other attention which may be required or desired. The upwardly extending elbow preferably expands from its base upwardly as does the throat. The fuel conduit sections are provided with a suitable device for locking them in their closed position such, for instance, as the pivoted hook-bar, $d$, and lug, $d'$. Near the point of discharge for the fuel, the conduit sections carry plates, $d^2$, and $d^3$, which unite when the conduit is closed, to form a feed plate adapted to deliver fuel over a blast casing, F, upon a distributing plate, G, mounted below the blast casing and extending within the fuel opening of the furnace. In the preferred form the plates $d^2$ and $d^3$ unite to form a ridge, that is, their upper surfaces slope upwardly and inwardly and intersect at the vertical axis of the conduit to form an angle like that formed by the upwardly sloping surfaces of a pitch roof. This composite ridge-shaped plate preferably slopes downwardly in the direction of the fire box. Longitudinally extending guide wings $d^5$ and $d^6$ are pivoted to the plates $d^2$ and $d^3$ by shafts $d^7$ and $d^8$ in such manner that their inner ends may be swung upwardly and downwardly on the sloping sides of the feed plate thereby controlling the delivery of fuel to different parts of the final distributing plate.

The distributing plate is preferably made with a central channel, $g$, with walls diverging from the feed toward the discharge end, and divergent side channels, $g'$, all of the channels being below the upper or normal surface of the plate.

H represents an engine for feeding the fuel, $h$ its piston rod and I, I', shafts carrying annular ratchets, $i$ and $i'$, adapted to be engaged by pawls, $i^2$, and $i^3$, carried by arms, $i^4$, and $i^5$, loosely mounted on the shafts and pivoted to a yoke, $i^7$, which carries a pin, $i^8$, adapted to ride in a sliding box, $h^2$, in a cross head $h'$ carried by the piston rod, $h$. Shaft, I', carries a gear, $i^6$, meshing with a like gear on shaft I'. It also carries a gear, $i^9$, meshing with a gear, $j$, carried by a shaft, J, which also carries a gear, $j'$, meshing with a gear, $b'$, on the shaft, $b$, of the screw conveyer. By reciprocation of the piston rod, $h$, the shafts, I and I', are alternately rotated in reverse direction by the action of the pawls on the ratchets, and the rotations of each of the shafts is transmitted to the other, thereby securing a practically continuous and powerful rotation of shaft, J.

The rotations of shaft, I, are transmitted to the shaft of the screw conveyer, through gears, $i^9$, and $j$, shaft, J, and gears, $j'$ and $b'$, thereby imparting a practically continuous and powerful rotation to the screw conveyer whereby the fuel is fed upwardly through the hopper and forced through the neck into the fire box. The funnel shape of the crushing knife and the throat, with the smaller diameters at their meeting line, prevents the falling back of coal into the hopper, and the funnel shape of the throat and upwardly extending elbow of the neck affords a freer discharge for the coal after it leaves the screw conveyer.

Figure 1:
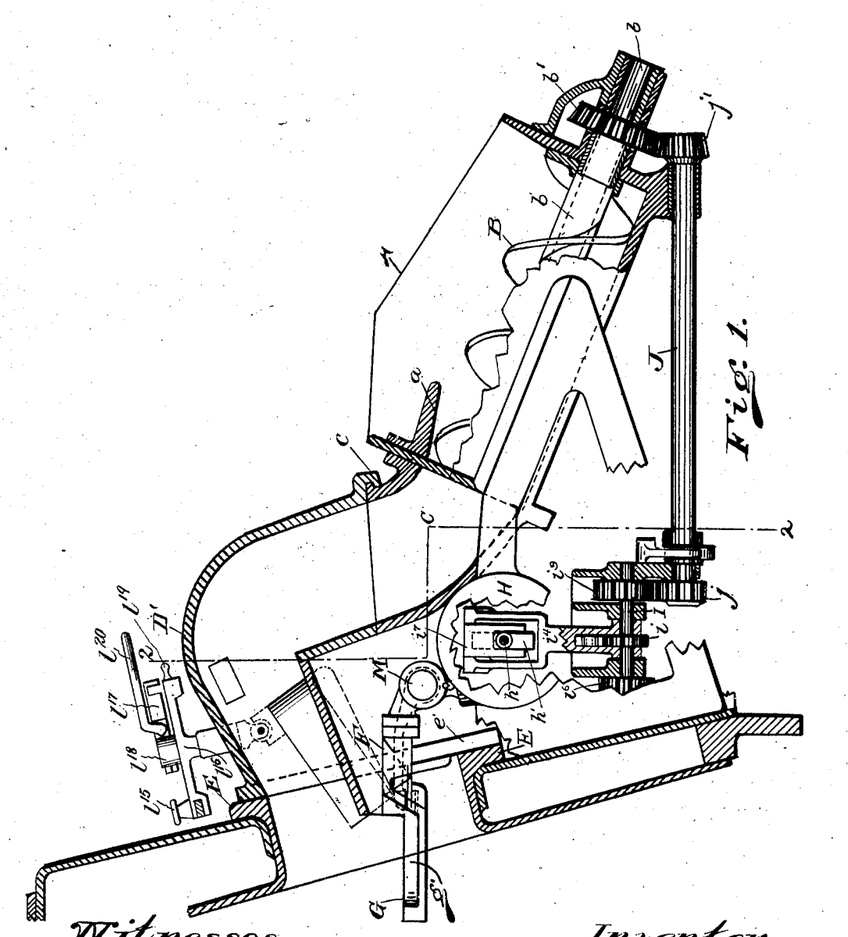
Figure 1 is a side elevation, partly in section, of my improved stoking apparatus.
Figure 2:
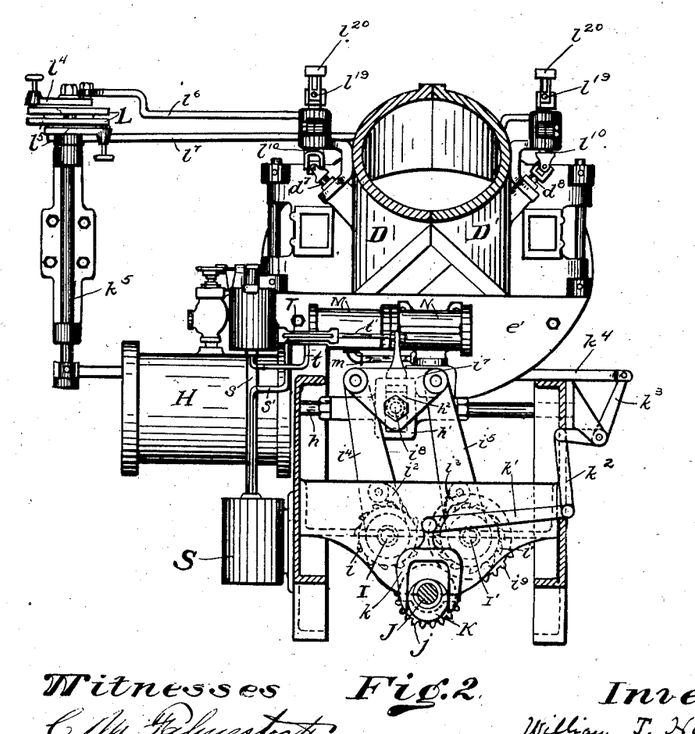
Fig. 2 a vertical section on the line 2—2 of Fig. 1 looking toward the fuel opening.
Figure 3:
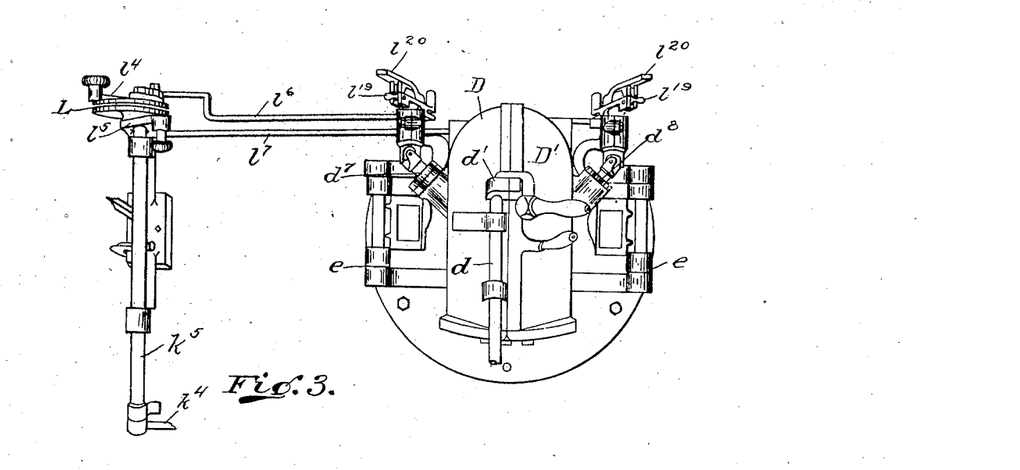
Fig. 3 a front view of a split feed-neck and of the feed controlling mechanism showing the neck closed and the controlling mechanism connected.
Figures 4, 11:
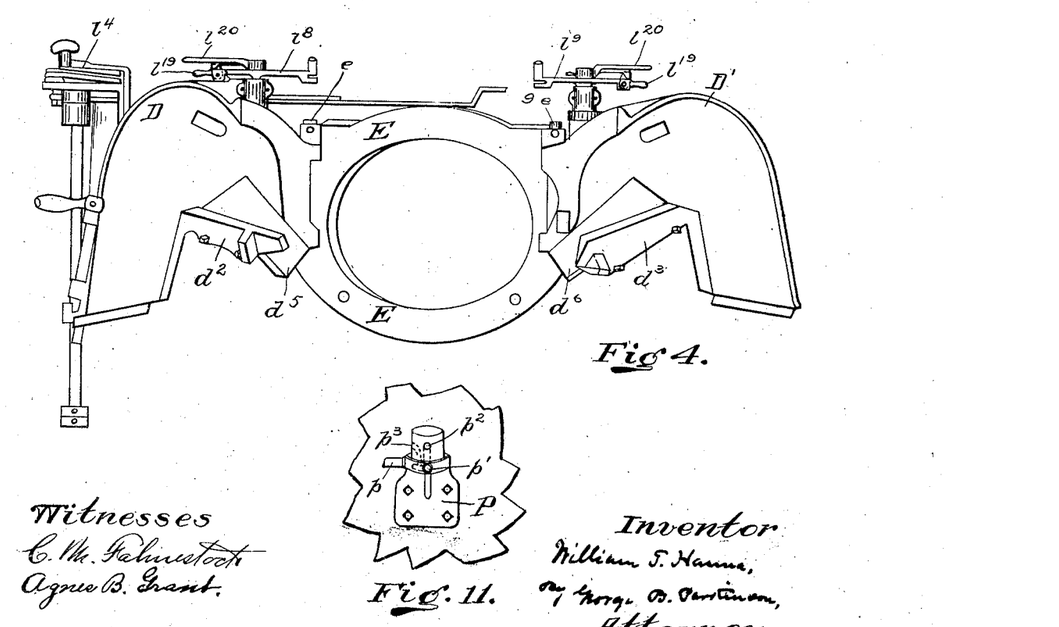
Fig. 4 a like view showing the neck open and the controlling mechanism disconnected.
Fig. 11 (Sheet 3) a detail of a steam joint element.
Figures 5, 6, 7, 8, 9:
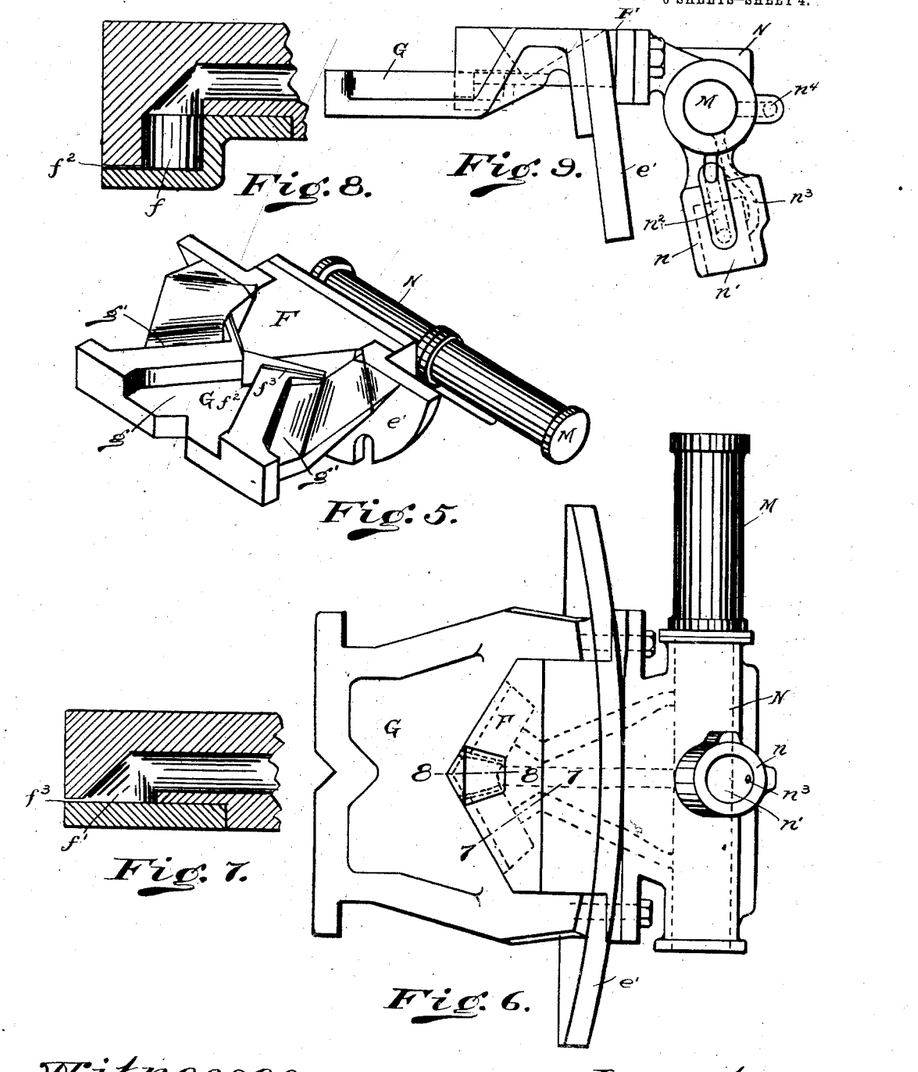
Fig. 5 a perspective view of a portion of the fuel distributing mechanism.
Fig. 6 a bottom plan view of the same.
Fig. 7 a section on the line 7—7 of Fig. 6.
Fig. 8 a section on the line 8—8 of Fig. 6.
Fig. 9 an end elevation of the controller valve mechanism.
Figure 10:
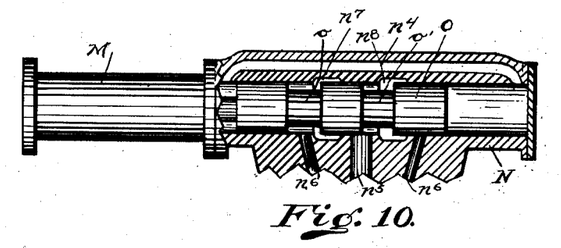
Fig. 10 (Sheet 2) a horizontal section of the controller valve.
Figure 12:
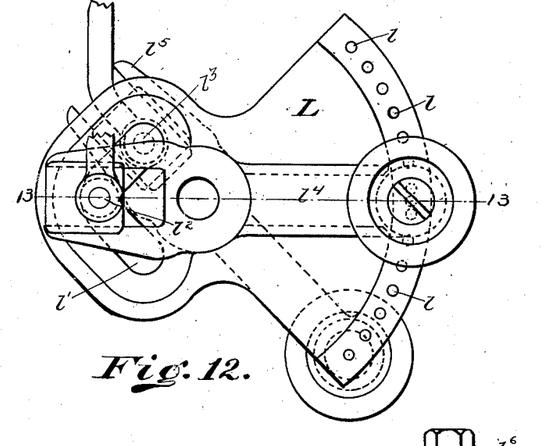
Fig. 12 a top plan view of a part of the feed controlling mechanism.
Figures 13, 14, 15:
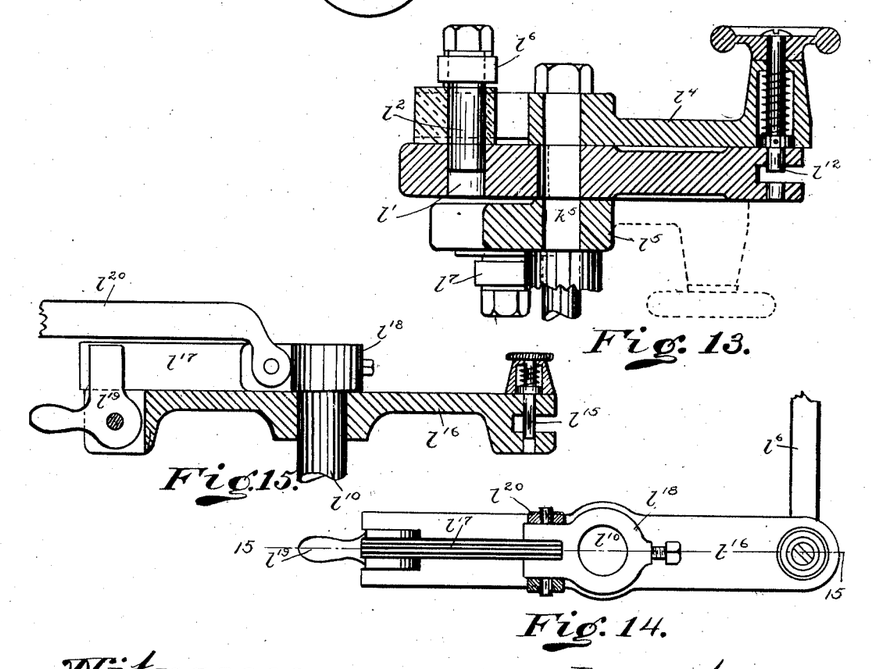
Fig. 13 a vertical section of the same on the line 13—13 of Fig. 12.
Fig. 14 a top plan view of a spring arm constituting a part of the connections of the feed controlling mechanism.
Fig. 15 a section on the line 15—15 of Fig. 14.
Figures 16, 17, 18, 19:
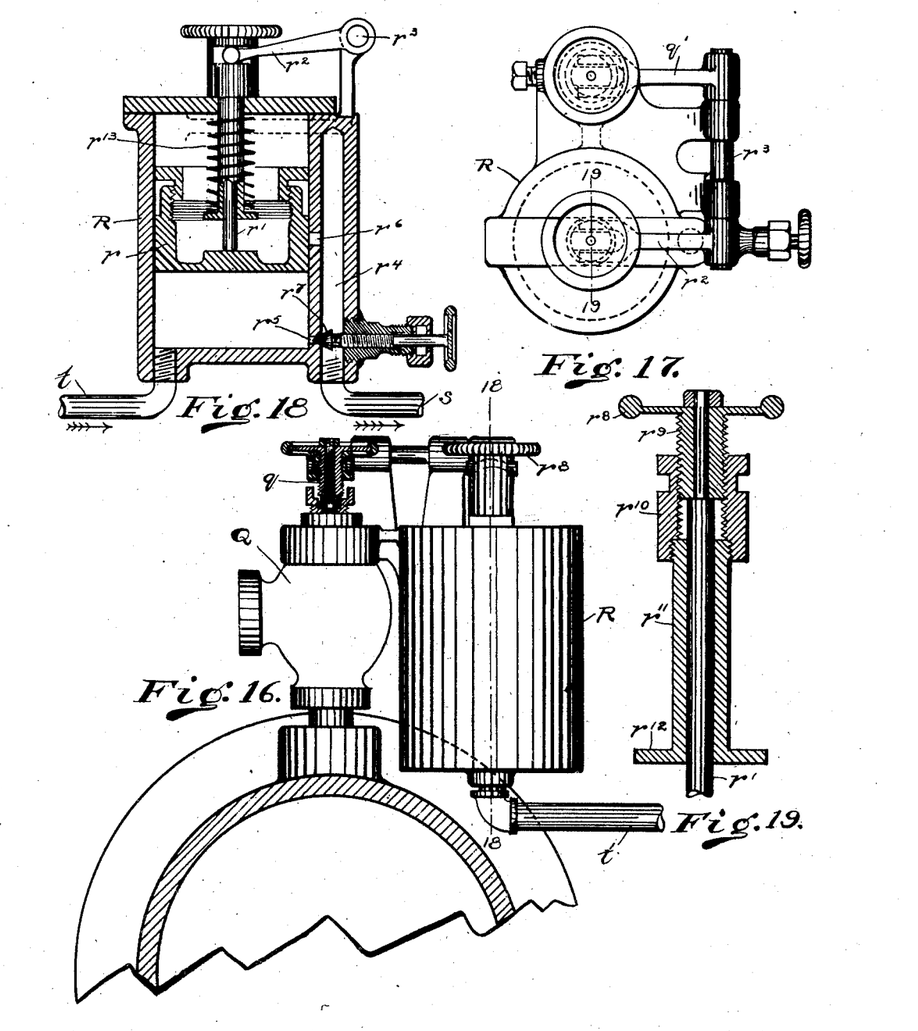
Fig. 16 a side elevation of the governor mechanism for the stoking engine showing its relation to the cylinder.
Fig. 17 a top plan view of the governor mechanism.
Fig. 18 a vertical section of a fluid chamber constituting part of the governor mechanism.
Fig. 19 a section on the line 19—19 of Fig. 17.

For the purpose of imparting a continuous motion to the guide wings of the delivery plate, a cam wheel, K, is secured to the rear end of shaft, J, which drives the conveyer shaft. The cam wheel actuates a sliding box or yoke, $k$, carrying a rod, $k'$, connected through link, $k^2$, elbow lever, $k^3$, and arm, $k^4$, with the crank arm of a rock shaft, $k^5$, to the upper end of which is fixed a segmental governing plate, L. This plate is provided with a series of holes, $l$, arranged in the arc of a circle, and with an angular slot, $l'$, into which take studs or pins, $l^2$ and $l^3$, on adjusting arms, $l^4$ and $l^5$, connected, preferably through arms, $l^6$ and $l^7$, and spring arms, $l^8$ and $l^9$, with rock shafts, $l^{10}$, having a jointed connection with the guide wing pivot shafts, $d^7$ and $d^8$. By these connections the cam imparts to the guide wings, $d^5$ and $d^6$, a continuous upward and downward swing upon the sides of the ridge plates, $d^2$ and $d^3$. For the purpose of regulating the length of stroke of the guide wings, the adjusting arms, $l^4$ and $l^5$ are provided with spring pins, $l^{12}$, adapted to take into selected apertures $l$ in the segmental plate. If both adjusting arms are connected with the central aperture of the arc, both of the arms, $l^6$ and $l^7$, are given their maximum throw and impart the maximum swing to the guide wings so that the delivery ends of the latter travel up and down the entire incline of the ridge plates. If one adjusting arm is connected with the aperture at one extreme of the arc, and the other with the aperture at the other extreme, the minimum throw is imparted to the arms, $l^6$ and $l^7$, and consequently to the guide wings. If the adjusting arm $l^4$, connecting with the short arm, $l^6$, is held by the upper aperture (Fig. 12) and the adjusting arm $l^5$ connecting with the long arm $l^7$, by the lower aperture, this minimum throw will limit the travel of the guide wings to the lower part of the inclines of the ridge plates. If the positions of the adjusting arms relatively to the segmental plate be reversed, the travel of the guide wings will be limited to the upper part of the inclines on the ridge plates. By adjusting the arms to different positions the feed can be controlled at will so that the discharge of fuel may be directed centrally, or to the sides, or partly to center and partly to either or both sides, as may be desired. The arms, $l^6$ and $l^7$, are connected with spring arms, $l^8$ and $l^9$, by spring pins, $l^{15}$, so that they may be readily disconnected for the purpose of opening the feed neck. In the form shown, the spring arms (Figs. 14 and 15) consist of a base, $l^{16}$, rotatably mounted on the guide wing rock shaft and carrying a leaf spring $l^{17}$, held at one end between ears projecting from a collar, $l^{18}$, fixed to the rock shaft, and normally held at the other end between ears projecting from an L-shaped dog, $l^{19}$, pivotally attached to the base. A handle, $l^{20}$, is secured to the collar, $l^{18}$, for convenience in actuating the guide wings by hand. The springs make a yielding connection between the lever arms, $l^6$ and $l^7$, and the rock shafts by which the guide wings are actuated, and yield laterally in response to any undue strain caused by clogging of the guide wings or otherwise, thereby avoiding danger of breakage. By swinging the dogs out of engagement with the springs, the rock shafts, $l^{10}$, may be freed from the domination of the cam and the intermediate connections, and the rock shafts and wing arms may be manipulated by hand if desired without disconnecting other parts of the mechanism.

While I have illustrated a ridge shaped plate with pivoted wings, good results may be obtained by the use of a flat plate with pivoted wings, or by making the deflecting wings integral with the plate and oscillating the plate.

M represents a steam engine hereinafter called the blast engine, N a valve casing and O a governor valve operated by the engine. The engine and casing are mounted upon a plate, $e'$, secured to the fuel door casing, E. Projecting downwardly and rearwardly from the valve chamber, N, is a cylindrical casing, $n$, inclosing a steam chamber, $n'$, and adapted to telescope into a cylindrical casing, P, attached to the boiler back and inclosing a steam chamber having steam connection with the boiler through ports, p and p', and communicating with the steam chamber, n', through ports, $p^2$ and $p^3$. The steam chamber, n', is provided with a port, $n^2$, leading into the valve casing, N, and a port, $n^3$, connecting with a pipe, m, leading to the blast engine. The casing, N, is provided with a steam by-pass, $n^4$, connecting its ends, and with a central eduction port, $n^5$, and side eduction ports, $n^6$, leading through the blast plate, F, to a central spreading chamber, f, and side spreading chamber, f', provided with slits, $f^2$, and $f^3$, for the discharge of the blast.

Adjacent to the ports the spreading chambers are comparatively high but they slope abruptly to the discharge slits. Their side walls diverge from the rear toward the discharge end. The discharge face of the blast casing is angular, that is, it is composed of two faces intersecting at the central line of the casing and diverging rearwardly from the point of intersection to the side lines of the casing. The material factor is to have discharge faces by which part of the fuel may be projected at angles to the longitudinal axis of the furnace.

The governor valve is provided with annular channels, o and o', and the valve chamber with annular channels, $n^7$ and $n^8$, so arranged that reciprocation of the valve in one direction opens the central port and one of the side ports, and reciprocation in the other direction opens the central port and the other side port.

For the purpose of regulating the steam pressure in the engine cylinder I have provided a governor of novel construction adapted for use in connection with my stoker mechanism.

Q (Figs. 2, 16–19) represents a governor valve, and R a plunger chamber in which is mounted a plunger, r, connected through plunger stem, r', crank arm, $r^2$, shaft, $r^3$, and crank arm, q', with the governor valve-stem, q, in such manner that raising or lowering the plunger raises or lowers the governor valve-stem, thereby decreasing or increasing the admission of steam. Oil, or some other non-volatile fluid is continuously supplied to the plunger chamber below the plunger, from a reservoir, S, through pipe, t, by means of a pump, T, operated by a rod, t', connected with the cross head, h'. An overflow passage, $r^4$, communicates with the plunger chamber by apertures, $r^5$ and $r^6$, and leads back through pipe, s, to the fluid reservoir. One of these apertures, $r^5$, is constantly open and the flow of the oil therethrough may be regulated by a needle valve, $r^7$. The outflow through this aperture is preferably so regulated that while the engine is working at normal speed the influx and outflow of fluid are of equal volume, or so regulated that the influx slightly exceeds the outflow. The other aperture $r^6$, is located adjacent to the normal position of the plunger in such position that with the engine working at normal speed, it allow the excess of fluid to escape, but holds the plunger at its normal level. If the speed of the engine falls below the normal, the speed of the pump decreases in like ratio; the outflow of fluid from the plunger chamber then exceeds the inflow, and the level decreases thereby lowering the plunger and the governor valve stem and increasing the admission of steam.

The plunger stem is supported by a hand wheel, $r^8$, carrying a boss, $r^9$, having a threaded connection with a collar, $r^{10}$, which is slotted to receive a yoke on the crank arm, $r^2$. The collar carries a sleeve, $r^{11}$, having at its lower end an annular flange, $r^{12}$, adapted to engage with a coiled spring, $r^{13}$, which has its upper bearing on the under side of the chamber top. By actuating the hand wheel the collar may be raised or lowered thereby decreasing or increasing the operative length of the rod without disturbing the other plunger mechanism; and through the crank arm connection the valve is raised or lowered for the admission of less or more steam.

In operation, the fuel is fed into the hopper A and forced into the conduit D D' by means of the screw conveyer. Lumps above the normal size are forced against the crushing knife a and reduced to a size which permits their passing into and through the neck. The upwardly expanding shape of the conduit prevents clogging. In case access to the fire box is desired, it can be obtained by opening the conduit. This may be done without disconnecting any other parts except the spring pins $l^{15}$. In the discharge end of the conduit the fuel passes onto the ridge plate and guide wings from which it is discharged over the blast casing F onto the distributing plate G. By means of the governing plate L and its connections, the position and travel of the guide wings, and consequently the proportions of feed delivered to the central and side channels of the distributing plate, may be adjusted at will. Raising the guide wings tends to central feed; lowering to side feed. Constant motion is imparted to the guide wings by means of cam wheel K and its connections. By swinging the dogs $l^{19}$ out of engagement the guide wings may be actuated by hand by means of the handles $l^{20}$ and their connections. If by reason of increased load due to obstruction or other cause, the speed of the engine falls below the normal, the speed of the oil pump of the governor decreases in like ratio, thereby decreasing the supply of oil to the plunger chamber. This permits the plunger and governor-valve stem to drop, thereby opening the valve and increasing the supply of steam to the engine cylinder. As the speed of the engine increases the speed of the pump also increases until normal conditions are restored.

I claim as my invention:

1. The combination of a furnace having a fuel opening, a fuel conveying mechanism adjacent to the furnace, and a fuel conduit arranged to receive fuel from the conveying mechanism and deliver it into the furnace, the fuel conduit being formed of longitudinally separable parts hinged to the door frame, substantially as specified.

2. The combination of a furnace; a feed hopper adjacent thereto; a screw conveyer mounted to rotate therein; means for operating the conveyer; a crushing knife in the form of a segment of a funnel mounted at the discharge end of the hopper; and a fuel conduit arranged to receive fuel from the hopper and deliver it into the furnace, substantially as specificed.

3. The combination of a furnace; a feed hopper adjacent thereto; a screw conveyer mounted to rotate therein; means for operating the conveyer; a crushing knife in the form of a segment of a funnel, converging from edge to heel, mounted at the discharge end of the hopper; and a fuel conduit arranged to receive fuel from the hopper and deliver it into the furnace, substantially as specified.

4. The combination in an automatic stoker of a feed plate; means for feeding fuel thereto; a distributing plate arranged to receive the fuel from the feed plate; guide wings adapted to oscillate upon the feed plate and direct the fuel to the distributing plate; means for forcing the fuel from the distributing plate into the fire box; and connections between the fuel feeding means and the guide wings whereby operation of the fuel feeding means oscillates the guide wings, substantially as specified.

5. The combination, in an automatic stoker, of a feed plate; means for delivering fuel to the feed plate; a blast casing; means for supplying a blast to the blast casing; pivotally mounted guide wings adapted to oscillate on the feed plate and control the direction of feed over the blast casing; and connections between the fuel feeding means and the guide wings whereby operation of the fuel feeding means oscillates the guide wings, substantially as specified.

6. The combination, in an automatic stoker, of a feed plate; means for delivering fuel to the feed plate; a blast casing; means for supplying a blast to the blast casing; pivotally mounted guide wings adapted to oscillate on the feed plate and control the direction of feed over the blast casing; connections between the fuel feeding means and the guide wings whereby operation of the fuel feeding means oscillates the guide wings; and means for adjusting the sweep of the guide wings, substantially as specified.

7. The combination in an automatic stoker of a feed plate; pivotally mounted guide wings adapted to oscillate thereon; means for feeding fuel thereto; connections between the fuel feeding means and the guide wings whereby operation of the fuel feeding means oscillates the guide wings; and means for adjusting the sweep of the guide wings, substantially as specified.

8. The combination in an automatic stoker of a feed plate; pivotally mounted guide wings adapted to oscillate thereon; means for feeding fuel thereto; connections between the fuel feeding means and the guide wings whereby operation of the fuel feeding means oscillates the guide wings; and means for adjusting the sweep of the guide wings independently of each other, substantially as specified.

9. The combination in an automatic stoker of a feed plate angular in cross section with its apex upward; pivotally mounted guide wings adapted to oscillate thereon; means for feeding fuel thereto; and connections between the fuel feeding means and the guide wings whereby operation of the fuel feeding means oscillates the guide wings, substantially as specified.

10. The combination in an automatic stoker of a feed plate, angular in cross section with the apex upward; pivotally mounted guide wings adapted to oscillate thereon; means for feeding fuel thereto; connections between the fuel feeding means and the guide wings whereby operation of the fuel feeding means oscillates the guide wings; and means for adjusting the sweep of the guide wings, substantially as specified.

11. The combination of a furnace; a fuel conveying mechanism adjacent to the furnace; a fuel conduit arranged to receive fuel from the conveying mechanism and deliver it into the furnace, and being formed of a plurality of longitudinally separable parts hinged to the furnace; plates carried by the conduit sections, the plates uniting within the conduit when the latter is closed, to form a feed plate; guide wings adapted to oscillate upon the feed plate; and means for oscillating the guide wings, substantially as specified.

12. The combination of a furnace; a fuel conveying mechanism adjacent to the furnace; a fuel conduit arranged to receive fuel from the conveying mechanism and deliver it into the furnace, and being formed of a plurality of longitudinally separable parts hinged to the furnace; plates carried by the conduit sections, the plates uniting within the conduit when the latter is closed, to form a feed plate; angular in cross section arranged with the apex upward; guide wings adapted to oscillate upon the inclined faces of the feed plate; and means for actuating the guide wings, substantially as specified.

13. The combination of a furnace; a fuel conveying mechanism adjacent to the furnace; a fuel conduit arranged to receive fuel from the conveying mechanism and deliver it into the furnace, and being formed of a plurality of longitudinally separable parts hinged to the furnace; plates carried by the conduit sections, the plates uniting within the conduit when the latter is closed, to form a feed plate; pivot shafts carrying the guide wings; rock shafts connected with the pivot shafts; and means for actuating the rock shafts, substantially as specified.

14. The combination in an automatic stoker of a feed plate; guide wings adapted to oscillate thereon; rock shafts connected with and adapted to oscillate the guide wings; a driven shaft; a rock shaft; operative connections between the driven shaft and the rock shaft; a segmental plate fixed to the rock shaft; and arms adjustably connected with the segmental plate and having an operative connection with the guide wing rock shafts, whereby the sweep of the guide wings may be varied, substantially as specified.

15. The combination in an automatic stoker of a feed plate angular in cross section with its apex upward; pivotally mounted guide wings adapted to oscillate thereon; rock shafts connected with and adapted to oscillate the guide wings; a driven shaft; a rock shaft; operative connections between the driven shaft and the rock shaft; a segmental plate fixed to the rock shaft; and arms adjustably connected with the segmental plate and having an operative connection with the guide wing rock shafts, whereby the sweep of the guide wings may be varied, substantially as specified.

16. The combination in an automatic stoker of a feed plate; pivotally mounted guide wings adapted to oscillate thereon; means for feeding fuel thereto; and adjustable connections between the fuel feeding means and the guide wings whereby operation of the fuel feeding means oscillates the guide wings, substantially as specified.

17. The combination in an automatic stoker of a feed plate; pivotally mounted guide wings adapted to oscillate thereon; means for feeding fuel thereto; and connections, including a yielding member, between the fuel feeding means and the guide wings whereby operation of the fuel feeding means oscillates the guide wings, substantially as specified.

18. The combination in an automatic stoker of a feed plate; pivotally mounted guide wings adapted to oscillate thereon; means for feeding fuel thereto; and adjustable connections, including a yielding member, between the fuel feeding means and the guide wings whereby operation of the fuel feeding means oscillates the guide wings, substantially as specified.

19. The combination in an automatic stoker of a feed plate; pivotally mounted guide wings adapted to oscillate thereon; rock shafts adapted to oscillate the guide wing shafts; arms having an operative connection with the rock shaft; pins on the arms at the ends opposite the rock shaft connection; a driven shaft; a rock shaft; operative connections between the driven shaft and the rock shaft; a segmental plate fixed to the rock shaft, provided at one end with an angular slot adapted to receive the pins on the arms which actuate the guide wing rock shafts and at the other with a series of locking elements arranged in the arc of a circle; adjusting arms pivotally mounted on the rock shaft; and means for locking the adjusting arms in selected positions on the segmental plate, substantially as specified.

20. The combination in an automatic stoker of a feed plate; pivotally mounted guide wings adapted to oscillate thereon; rock shafts adapted to oscillate the guide wing shafts; arms having an operative connection with the rock shaft connection; a driven shaft; a rock shaft; operative connections between the driven shaft and the rock shaft; a segmental plate fixed to the rock shaft, provided at one end with an angular slot adapted to receive the pins on the arms which actuate the guide wing rock shafts, and at the other end with a series of apertures arranged in the arc of a circle; adjustable arms pivotally mounted on the rock shaft; and spring pins on the adjusting arms adapted to engage with the apertures in the segmental plate, substantially as specified.

21. The combination in an automatic stoker of a ridge-shaped feed plate; pivotally mounted guide wings adapted to oscillate thereon; rock shafts connected with and adapted to oscillate the guide wings; a driven shaft; a rock shaft; operative connections between the driven shaft and the rock shaft; and operative connections between the rock shaft and the guide wing rock shafts, said connections including a yielding member which permits the connections to yield to undue strain, substantially as specified.

22. The combination in an automatic stoker of a feed plate; pivotally mounted guide wings adapted to oscillate thereon; rock shafts connected with and adapted to oscillate the guide wings; a driven shaft; a rock shaft; operative connections between the driven shaft and the rock shaft; and operative connections between the rock shaft and the guide wing rock shafts, said connections including a spring arm adapted to yield to undue strain, and a dog adapted to engage or disengage the spring arm, substantially as specified.

23. In a blast feed stoker, a blast casing having central and side ports; a spreading chamber for each of the ports, the spreading chambers having discharge slits, the discharge faces for the side ports being arranged at an angle to each other and converging toward the front end of the casing, substantially as specified.

24. In a blast feed stoker, a blast casing having central and side ports, a spreading chamber for each of the ports, the spreading chamber having diverging walls and discharge slits, substantially as specified.

25. In a blast feed stoker, a blast casing having central and side ports; a spreading chamber for each of the ports, the spreading chambers having diverging walls and discharge slits and the discharge faces for the side ports being arranged at an angle to each other and converging toward the inner end of the casing, substantially as specified.

26. In a blast feed stoker, the combination with a blast casing adapted to deliver blasts at different levels, of a distributing plate having feed surfaces at different levels, each arranged to receive a blast, the plate being formed with a low central feed surface, confined by walls diverging from the feed toward the discharge end, divergent side channels, and intermediate feed surfaces at the upper level, substantially as and for the purpose specified.

27. In a blast feed stoker, the combination with a blast casing, adapted to deliver blasts at different levels, of a distributing plate having feed surfaces at different levels each arranged to receive a blast, the plate being formed with a central feed surface at the lower level confined by walls diverging from the feed toward the discharge end, intermediate feed surfaces at the upper level, and divergent side channels sloping from the upper toward the lower level, substantially as specified.

28. A distributing plate for blast feed stokers having feed surfaces at different levels, the plate being formed with a low central feed surface confined by walls diverging from the feed toward the discharge end, divergent side channels, and intermediate feed surfaces at the upper level, substantially as and for the purpose specified.

29. In a blast feed stoker, the combination of a fuel door frame; a plate detachably secured thereto; an engine and valve chamber carried by said plate; a steam joint element having steam communication with the engine and valve chamber; and a steam joint element adapted to connect therewith, mounted on the boiler back and having steam communication with the boiler, substantially as specified.

30. In a blast feed stoker, the combination of a fuel door frame; a plate detachably secured thereto; an engine and valve chamber carried by said plate; a steam joint element having steam communication with the engine and valve chamber; and a steam joint element, mounted on the boiler back and having steam communication with the boiler, the steam joint elements being detachably connected, substantially as specified.

31. The combination in an automatic stoker, of an engine for feeding the fuel; a governor valve; a plunger chamber provided with an outflow passage normally open; a plunger mounted therein; connections between the plunger rod and the valve stem whereby movement of the plunger increases or decreases the admission of steam; a fluid reservoir having a pipe connection with the plunger chamber; and a pump, actuated by the piston of the fuel feeding engine, for forcing fluid from the reservoir into the plunger chamber, substantially as and for the purpose specified.

32. The combination in an automatic stoker, of an engine for feeding fuel; a governor valve; a plunger chamber provided with an outflow passage normally open; a plunger mounted therein; connections between the plunger rod and the valve stem whereby movement of the plunger increases or decreases the admission of steam; a fluid reservoir having a pipe connection with the plunger chamber; a pump, actuated by the piston of the fuel feeding engine, for forcing fluid from the reservoir into the plunger chamber, and means for regulating the normal outflow, substantially as and for the purpose specified.

33. The combination in an automatic stoker, of an engine for feeding the fuel; a governor valve; a plunger chamber provided with an outflow passage normally open; a plunger mounted therein; connections between the plunger rod and the valve stem whereby movement of the plunger increases or decreases the admission of steam; a fluid reservoir having a pipe connection with the plunger chamber; means for adjusting the relation of the plunger and the valve stem; and a pump, actuated by the piston of the fuel feeding engine, for forcing fluid from the reservoir into the plunger chamber, substantially as and for the purpose specified.

34. The combination in an automatic stoker, of an engine for feeding the fuel; a governor valve; a plunger chamber, provided with an outflow passage normally open, and an overflow passage; a plunger mounted in the chamber; connections between the plunger rod and the valve stem whereby movement of the plunger increases or decreases the area of the steam passage; a fluid reservoir having a pipe connection with the plunger chamber; and a pump, actuated by the piston of the fuel feeding engine, for forcing fluid from the reservoir into the plunger chamber, substantially as specified.

35. The combination in an automatic stoker, of an engine for feeding the fuel; a governor valve; a plunger chamber provided with an outflow passage normally open, and an overflow passage; a plunger mounted in the chamber; connections between the plunger rod and the valve stem whereby movement of the plunger increases or decreases the area of the steam passage; a fluid reservoir having a pipe connection with the plunger chamber; means for adjusting the relation of the plunger and the valve stem; and a pump, actuated by the piston of the fuel feeding engine, for forcing fluid from the reservoir into the plunger chamber, substantially as and for the purpose specified.

36. The combination in an automatic stoker, of an engine for feeding the fuel; a governor valve; a plunger chamber provided with an outflow passage normally open, and an overflow passage; a plunger mounted in the chamber; connections between the plunger rod and the valve stem whereby movement of the plunger increases or decreases the area of the steam passage; a fluid reservoir having a pipe connection with the plunger chamber; a pump, actuated by the piston of the fuel feeding engine, for forcing fluid from the reservoir into the plunger chamber; and means for regulating the normal outflow, substantially as and for the purpose specified.

37. The combination in an automatic stoker, of an engine for feeding the fuel; a governor valve; a plunger chamber, provided with an outflow passage normally open, and an overflow passage controlled by the plunger; a plunger mounted in the chamber; connections between the plunger rod and the valve stem whereby movement of the plunger increases or decreases the area of the steam passage; a fluid reservoir having a pipe connection with the plunger chamber; and a pump, actuated by the piston of the fuel feeding engine, for forcing fluid from the reservoir into the plunger chamber, substantially as and for the purpose specified.

WILLIAM THOMPSON HANNA.

Witnesses:
W. W. SYMMES,
AGNES B. GRANT.